(12) United States Patent
Lownds

(10) Patent No.: US 6,287,496 B1
(45) Date of Patent: Sep. 11, 2001

(54) METHOD OF GRANULATING PEAT USING GENTLE EXTRUSION CONDITIONS AND VISCOSIFIED WATER

(75) Inventor: Charles Michael Lownds, Edina, MN (US)

(73) Assignee: Bene-Tech, Inc., Rosemount, MN (US)

( * ) Notice: Subject to any disclaimer, the term of this patent is extended or adjusted under 35 U.S.C. 154(b) by 0 days.

(21) Appl. No.: 09/420,315

(22) Filed: Oct. 19, 1999

Related U.S. Application Data (62) Division of application No. 08/852,853, filed on May 7, 1997, now abandoned.

(51) Int. Cl.[7] .............. B29C 9/12; C05F 11/02; C05G 5/00
(52) U.S. Cl. .............. 264/118; 71/24; 71/64.03
(58) Field of Search .............. 264/118; 71/24, 71/64.03

(56) References Cited

U.S. PATENT DOCUMENTS

| | | |
|---|---|---|
| 4,045,204 * | 8/1977 | Matsunaga et al. ........... 71/24 |
| 4,174,957 | 11/1979 | Webb et al. . |
| 4,357,758 | 11/1982 | Lampinen . |
| 4,424,645 | 1/1984 | Rannali . |
| 4,571,254 | 2/1986 | Wahlberg . |
| 4,592,837 | 6/1986 | Ludwig et al. . |
| 4,676,196 | 6/1987 | Lojek et al. . |
| 4,698,225 | 10/1987 | Morrison . |
| 4,756,319 | 7/1988 | Takanashi . |
| 4,829,045 | 5/1989 | Fransham . |
| 4,906,388 | 3/1990 | Cain et al. . |
| 4,909,508 | 3/1990 | Noland et al. . |

FOREIGN PATENT DOCUMENTS 7-241139 * 9/1995 (JP) .

* cited by examiner

Primary Examiner—Leo B. Tentoni
(74) Attorney, Agent, or Firm—Faegre & Benson LLP (57) ABSTRACT

Peat-containing granules possessing numerous beneficial properties can be prepared by a process involving gentle extrusion in which viscosified water is used in the extrudable composition. Advantageously, gentle extrusion allows a peat-containing extrudate to be formed in which the beneficial properties of the raw peat are well preserved. In preferred embodiments, gentle extrusion is achieved by using an extrusion die provided with a plurality of apertures and a relatively large open area which allow low extrusion pressures to be used.

24 Claims, 1 Drawing Sheet

Fig. 1

METHOD OF GRANULATING PEAT USING GENTLE EXTRUSION CONDITIONS AND VISCOSIFIED WATER

REFERENCE TO RELATED APPLICATION

This application is a divisional of application Ser. No. 08/852,853 filed on May 7, 1997, now abandoned.

FIELD OF THE INVENTION

This invention relates to a method of granulating peat and as well as to granule compositions containing peat. More particularly, the invention relates to a method of granulating peat and the resultant granules, wherein the method uses an extruder in a manner that preserves the beneficial properties of the raw peat.

BACKGROUND OF THE INVENTION

In 1994 the United States imported 665,000 tons of peat and harvested 574,000 tons of peat locally. Of the locally produced peat, over 60% was used in general soil improvement and in potting soils. In Russia and Europe, millions of tons of peat are used as a fuel and as a raw material for the production of coke. These Russian and European applications of peat exploit its moderate calorific value, carbon content, and generally low ash content compared to coal. Previously, granulated peat has not been used as a fuel because of the added cost associated with converting raw peat into granules and because most fuel uses involve large scale mechanical handling.

Most of the peat used in the U.S. is packaged in bags, bales or supersacks. In order to render the peat suitable for packaging in these forms, it is generally dried after harvesting and then either macerated or hammermilled to improve its handling characteristics. Even after this treatment, peat is difficult to handle, has a tendency to clump, and is not easy to spread in thin layers, for example, on soil. In addition, loose peat, when partially dried, is very dusty. The dustiness becomes worse as the water content of loose peat is reduced. The dust is brown and can be acidic on the skin, making peat handling operations potentially an unpleasant task.

Loose peat has a variety of uses. It is used as a culture medium for earthworms and mushrooms, as an additive to fertilizers, as a seed inoculant, and for many horticultural and turf-raising purposes. Peat is also used as a chemical spill absorbent, especially as an oil absorbent. The very high oil absorbency of peat is widely exploited in the oil industries of the Southern U.S. Peat also absorbs many times its own weight of water, and has useful ion exchange properties. Peat is therefore used to filter water, and is especially useful for removing heavy metals from water.

Peat is generally dried to about 50% water content before harvesting or before packaging. Transportation of such peat carries a cost penalty because of the high water content. On the other hand, if loose peat is dried to less than about 35% water, it is usually very dusty to handle.

In Europe and Russia, peat is used in the chemical and health care industries. Chemicals that can be extracted from peat includes waxes, bitumen, resins, carbohydrates, humic acids, lignin and pectins. With regard to health care, peat is used in peat baths and contains a variety of pharmacologically active ingredients.

Peat is naturally slightly acidic in nature due to the presence of humic acids. As an animal litter, peat has the useful property of absorbing and neutralizing urea, thus controlling the odor of urine. For example, U.S. Pat. No. 5,060,598 claims the use of peat to control odor in cat litter. On the other hand, the acidity of peat is often disadvantageous in horticultural use, and it has to be counteracted by addition of a basic chemical such as lime. It would be desirable if there was an easy way to control the pH of commercially supplied products incorporating peat.

Organic materials are commonly prepared in granular form by one of two methods: high pressure extrusion or pelletization. High pressure extrusion is very widely used to prepare foods such as breakfast cereals and pet foods. The extruders used are called "cooker-extruders" and they induce very high shear into the material towards the exit end of the extruder. This produces a high temperature for a short time. This high temperature sterilizes the food and gelatinizes the starches in the formulation. Extrudates from cooker extruders are consolidated to close to the maximum density due to the high pressures, but lower densities have been achieved by inclusion of a blowing agent which causes the composition to generate gas bubbles as it exits the high pressure extruder. Such techniques are not suitable for making peat granules, because the aggressiveness of these processes tends to destroy the beneficial properties of the peat.

Other organic materials, such as saw dust and waste paper, are made into granules by use of a pellet mill. Pellet mills operate on blends of dry materials with low water content. The materials are forced through the holes in the die by rollers. The pressure generated in pellet mills is extremely high, and very dense granules with low porosity due to low void space are produced by pellet mills. In principle, peat could be pelletized using a pellet mill, but the resulting pellets would be dense and would not possess all the beneficial properties offered by this invention.

SUMMARY OF THE INVENTION

Applicant has found that peat-containing granules possessing numerous beneficial properties can be prepared by a process involving gentle extrusion in which viscosified water is used in the extrudable composition. Advantageously, gentle extrusion allows a peat-containing extrudate to be formed in which the beneficial properties of the raw peat are well preserved. In preferred embodiments, gentle extrusion is achieved by using an extrusion die provided with a plurality of apertures and a relatively large open area which allow low extrusion pressures to be used.

The use of viscosified water provides an extrudable composition in which the water has a dramatically reduced tendency to undergo phase separation during extrusion. As a result, uniform, low density, porous, robust, free-flowing peat-containing granules can be prepared in high volume at low cost. Extrusion is much more difficult to control in the absence of such viscosified water. Indeed, when making granules from ingredients including peat and water, it is sometimes nearly impossible to obtain a cohesive extrudate in the absence of viscosified water.

Advantageously, peat granules of this invention are easy to handle and transport. They can be transported in bulk or easily packaged in bags or other suitable storage means of any size convenient to the user. Because the granules have low water content, (less than 10% water in preferred embodiments) the cost of transporting the granules is reduced.

Also, the granules are easily made with a spherical shape, which further eases handling and transport.

Granular peat of this invention is easy to apply in many applications. For soil improvement, granular peat could be sown by a conventional fertilizer spreader. For soil blending and potting, the peat could easily be poured into the mixer or container of use. Likewise as an absorbent, granular peat could easily be poured and spread as needed.

In many applications, for example in spill absorption and in water filtration, the peat granules preferably can maintain their form during and after use. Peat granules of this invention may be spread onto the floor to absorb a spill without disintegration. They can remain granular so that they can be easily swept up and disposed of after use. In some states, the oil soaked peat granules may thereafter be used as a fuel. Granules that maintain their integrity when soaked would be of useful and consistent form to feed to a furnace.

In horticultural applications it may be desirable for the peat granules to disintegrate some time after application. Advantageously, this invention provides a method of granulation of peat that allows the integrity and strength of the granule to be readily selected and controlled.

Further, the peat granules could be subjected to aqueous or solvent extraction of chemicals without loss of physical form or absorbency, so that the granules could be dried and used for soil improvement or as an absorbent after useful chemicals had been extracted from them. This makes the granules particularly useful in the chemical and health care industries.

Many of the uses of peat take advantage of its very high capacity to absorb and retain water and oil. Advantageously, the present invention preserves, to a significant extent, the microscopic structure of the peat, and therefore preserves, to a significant extent, the beneficial water and oil absorbing properties of peat.

The granules can also be made without additional ash producing chemicals. Such granules could be used as a starting material for the production of activated charcoal or carbon.

Since peat is used very widely in horticulture, plant nutrients can be incorporated into the peat granules with beneficial results. Peat itself is low in plant nutrients. Fertilizer compositions made with peat and inorganic or organic sources of nitrogen, phosphorous and potassium, as well as sulfur, iron and other trace nutrients, would have a dual purpose of fertilizing the soil and improving its texture.

One aspect of the present invention concerns a plurality of extruded, porous, peat containing granules. Peat containing granules of the present invention comprises a plurality of peat fibers and a binder in an amount effective to cohesively bind the peat fibers together in a manner such that there is substantially no adhesion between the granules.

In another aspect, the present invention provides an extrudable composition suitable for forming peat containing granules. The composition includes a plurality of peat particles; a binder in an amount effective to cohesively bind the peat particles together in a manner such that there is substantially no adhesion between granules formed after extrusion; an amount of viscosified water effective to provide the composition with a consistency such that the composition can be cohesively extruded; and an optional water soluble viscosifier in an amount effective to substantially prevent phase separation between the peat and water during extrusion.

In another aspect, the present invention provides a method of making peat containing granules. According to the method, an extrudable composition as described above is provided. The composition is extruded to form a wet, cohesive extrudate. The wet, cohesive extrudate is then divided into a plurality of wet, peat-containing particles. The wet, peat-containing particles are dried until the particles contain less than about 15% by weight water, whereby the peat containing granules are formed.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 1:
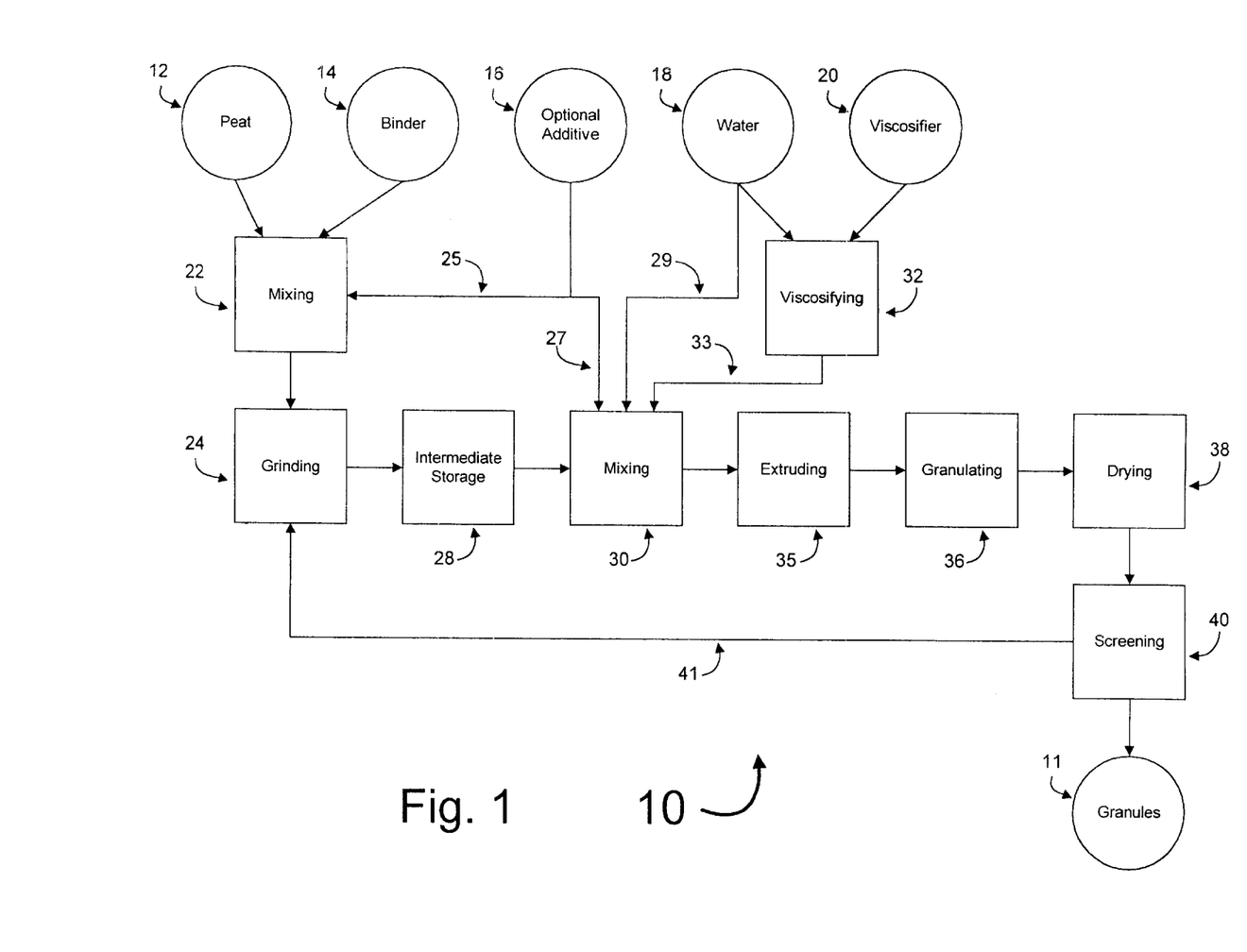
FIG. 1 is a flow chart of one process for making peat granules in accordance with the principles of the present invention.

FIG. 1 shows a flow chart of one preferred process, generally designated 10, for making extruded, porous, peat-containing granules of the present invention. According to process 10, peat containing granules 11 are formed from ingredients comprising peat 12, a binder 14, optional additives 16, water 18, and an optional water soluble viscosifier 20. Any kind of peat could be used in the present invention, and the present invention is not intended to be limited to only one kind of peat. Advantageously, because the present invention provides peat-containing granules II in such a way that the properties of the original peat 12 are substantially preserved, a peat 12 may be selected which has properties appropriate for the intended use of the granules 11. For example, if granules 11 with relatively high oil absorption number are desired, then a peat 12 with correspondingly high oil absorption number could be used to make granules 11. As another example, if granules 11 with acidic properties are desired, then an acidic peat 12 could be used to make granules 11. As a further example, if granules 11 suitable for soil improvement properties are desired, then peat 12 with corresponding soil improvement properties could be used to make granules 11.

Representative examples of peat suitable in the practice of the invention include high moor peats such as mosses (Sphagnum), cottongrass (Eriophorum), health plants (various genera of Ericaceae), combinations of these, and the like. Other examples of suitable peats include the low-moor peats such as frondiferous mosses (Hypnum), reeds (Phragmites), sedges (Carex), alder (Alnus), willow (Salix), birch (Betula), lowland conifers, combinations of these, and the like. Other types of suitable peats include rush (Scheuchzeria) and bulrushes (Scirpus), both of which may be found in low or high peatlands, as well as sedimentary or lake peat, sapropel, combinations of these, and the like.

Before being used in process 10, raw peat is preferably screened in order to remove rocks, sticks, and other debris gathered with the peat during the harvesting process. Generally, most commercially available peat has already been screened by the harvester.

Raw peat is typically in the form of fibrous particles. It may often be desirable to preserve the natural fibrous character of peat during the process of making peat granules 11 using extrusion techniques of this invention. However, the relatively long, fibrous particles of raw peat have a tendency to mat up against an extrusion die. This causes the resultant fibrous mat to compress and expel water. This phase separation between the raw peat and the water not only may cause extrusion pressures to go up to undesirably high levels, but it may also cause undesirable stoppage of the extrusion process if the die is plugged up too severely. Additionally, if an extrudate is formed in spite of such matting, the extrudate could suffer from poor cohesion due to the water loss that occurs as a result of fiber matting at the die. As one way to help avoid this phase separation problem during extrusion, the raw peat fibers are desirably ground, as described below, to produce a more finely divided material that can pass through the extrusion die more easily.

Raw peat may appear to be dry in some instances or somewhat damp in other instances, because the water content of raw peat can vary widely. Preferably, the water content should be just low enough to facilitate mixing and grinding. However, if the water content of the peat 12 is too low, then the peat 12 may be too dusty, causing handling problems. Also, dry peat can pose a fire hazard. On the other hand, if the water content is too high, then the peat particles may be more difficult to grind to the desired final size. In particular, if the grinding is done by hammermilling, then wet peat tends to blind the screens of the hammer mill. Preferably, the raw peat has a water content in the range from 30 to 60 weight percent based upon the weight of the wet peat.

Binder 14 performs multiple functions. Firstly, binder 14 functions like a glue to help hold the peat fibers together during extrusion and in the resultant granules 11. In other words, binder 14 provides cohesion during the extrusion and granulation steps to be described below. Binder 14 may also function as an extrusion aid to help prevent phase separation between the water 18 and peat 12 that might otherwise tend to occur during extrusion. To prevent such phase separation, preferred embodiments of binder 14 function as a water viscosifying agent, thickening water 18. The thickened water has a greatly reduced tendency to undergo phase separation during extrusion as compared to unthickened water. Compositions including thickened water are thus easier to extrude, and higher quality extrudates can be obtained.

Generally, an amount of binder 14 is preferably used which is effective to provide a granular material in step 36 in which the peat fibers are cohesively bound together while showing substantially no adhesion between the granules in step 36. In this way, the granules in step 36 do not stick to each other during granulating step 36 or drying step 38. If too little of binder 14 is used, then the resultant granular material in step 36 may be too dry and crumbly. If too much binder 14 is used, the granular material in step 36 may be too sticky. Also, the excess binder 14 may dilute the beneficial properties of the raw peat. In preferred embodiments, using from 1 to 10 parts by weight, more preferably about 2 to about 6 parts by weight of binder 14 per 100 parts by weight of peat 12 on a dry weight basis would be suitable in the practice of the present invention.

A wide variety of binder materials may be used as binder 14 with beneficial results. Generally, desirable characteristics for a binder material include the ability to cohesively bind peat particles together with substantially no adhesion between the resultant granules 11. Any binder that is soluble in or emulsifiable in water would be a suitable candidate for some applications. If the peat granules need to be biodegradable, a biodegradable binder might be selected. Conversely, if the peat granules need to be resistant to degradation when wet (in use or otherwise), then a water insoluble binder should be used. Suitable binders may therefore be derived from those binders found to be suitable in the food, wood glue, paint, paper, particle board industries, or the like. Additionally, a good binder material should combine with the other ingredients and help provide an extrudable composition having a degree of moldability and plasticity suitable for extruding.

One preferred class of binders includes starches such as wheat starch, rice starch, tapioca starch, rye starch, soy bean starch, potato starch, corn starch, combinations of these, and the like. All the starches referred to may be in the form of flour or in the form of pregelatinized starch. Of these, wheat starch is presently preferred. Advantageously, starches such as wheat starch also function as a water viscosifier. Another class of binders comprises binders based on proteins, for example, casein, soybean meal, or the like. Another preferred class of suitable binders comprises water-soluble polyvinyl polymers such as those based on polyvinyl alcohol or polyvinyl acetate and the like. Another class of suitable binders comprises urea, urea derivatives, or combinations thereof. Combinations of urea and materials containing carbohydrates such as starch, wheat middlings, dried molasses, soybean meal, and the like may also be used as binders. A preferred use of this class of binder would be to incorporate into the peat composition, as a binder phase, a combination including 7 to 100 parts by weight of urea based upon 10 to 100 parts by weight of a material containing a carbohydrate. For fertilizer applications, for example, a binder including a combination of dried molasses and a urea (or urea derivative) would be suitable.

Peat 12 and binder 14 are combined in mixing step 22 to provide a first admixture to be ground in grinding step 24. Mixing step 22 may be accomplished in a separate mixing apparatus such as a ribbon blender or bowl mixer. Alternatively, the ingredients to be ground may be added at controlled rates to a suitable continuous grinding apparatus, such as a hammer mill, in which case mixing step 22 and grinding step 24 occur simultaneously in the same apparatus as the ingredients are mixed together and ground to a finer size during grinding.

In addition to peat 12 and binder 14, other optional additives 16 may be mixed with the peat 12 and binder 14, as desired, in order to impart particular qualities to the resultant granules 11 and/or to the composition to be extruded. Representative examples of optional additives 16 that may be used include additional binder materials, wetting agents, fungicides, bactericides, bacterial cultures, carbon black, organic or inorganic fertilizer ingredients, minerals, sunflower hull ash, sodium bicarbonate, sodium carbonate, limestone, citric acid, humic acid, acetic acid, mineral acid, any other ingredients that may impart desirable properties to granules 11, combinations of such additives, or the like.

FIG. 1 shows two preferred ways in which optional additives 16 may be combined with peat 12 and binder 14. As one option, as shown by flow chart line 25, some or all of optional additives 16 are combined with peat 12 and binder 14 during mixing step 22 which occurs either before or concurrently with the grinding step 24. As an alternative, as shown by flow chart line 27, some or all of optional additives 16 can be combined with peat 12 and binder 14 after grinding step 24 in mixing step 30. Choosing to add some or all of optional additives 16 either at mixing step 22 or mixing step 30 is primarily a practical decision. For example, if any optional additive 16 is supplied in a particle and/or agglomerate size which is too big to be extruded conveniently, such additive can be combined with the other ingredients in mixing step 22. In this way, such additive can be ground to a more suitable size. On the other hand, if the particle size of any such additive is already suitable for extruding, or if the additive is in a form, such as a liquid form, which would make grinding more difficult, then adding any such additive during mixing step 30 would be more desirable.

The admixture of peat 12, binder 14, and any optional additives 16, if desired, are subjected to grinding step 24 in order to grind the peat fibers and any other large-sized ingredients to a size roughly corresponding to or less than the size of granules 11 to be formed. Grinding can be accomplished using any suitable grinding apparatus. A hammer mill is preferred for this purpose. During grinding step 24, the peat particles are ground sufficiently such that the length of the longest peat fibers is less than or equal to the desired diameter of granules 11. The ground fibers should also be short enough to pass through the openings of the extruder die being used. As one representative example, using a 1.19 mm screen on a hammer mill to pass relatively few peat fibers having a length greater than 1.19 mm was found to be suitable for making granules having a diameter of about 2 mm.

As described above, the ingredients to be ground should desirably not include too much water to allow for efficient grinding. If the ingredients are too dry, then water or some other liquid may be added to control dust if necessary. If too wet, the ingredients could be dried before grinding, but this would add unnecessary drying expense to the process 10.

After grinding step 24 is completed, some or all of optional additives 16 not already combined with the other ingredients may be added during mixing step 30.

Next, water 18 is combined with the other ingredients during mixing step 30. Any suitable mixing apparatus can be used to accomplish the mixing step 30, but a continuous mixing apparatus is preferred for this purpose. Suitable continuous mixers include those commonly used immediately upstream of extruders and pellet mills, for example ribbon mixers, paddle mixers, screw mixers, twin screw mixers, and the like. The amount of water added at this point in process 10 is not critical so long as enough water is added to make the resultant composition extrudable under the selected extrusion conditions. An appropriate amount of water to add is easily determined by observing and squeezing by hand the product of the mixing step 30, and/or the extrudate from extruding step 35 and/or quality of the granular material in step 36. If too little water is present, the extrudable composition will be dry and crumbly and difficult to extrude. Extrusion pressures may increase too much as well. Also, the extrudate will be difficult to form into granule-shaped particles during granulating step 36. If too much water is present, the extrudate and/or the granular material in step 36 may be too weak, if the binder level is low, or too sticky if the binder level is high. Additionally, another drawback of using too much water is that drying costs increase. Accordingly, just enough water is added to provide an extrudable composition characterized by relatively low extrusion pressures and good moldability and plasticity during extruding and/or granulating steps 34 and 35.

The amount of water required depends strongly on the type of raw peat 12 and on the amount and type of additives 16 which may be present in mixing step 30. Additives 16 which are water soluble will require less water 16 to be added at mixing step 30. In preferred embodiments, adding 50 to 250 parts by weight, more preferably 100 to 150 parts by weight of water, based upon 100 parts by weight of peat 12 on a dry basis would be suitable in the practice of the present invention.

It is particularly preferred that the binder 14 and/or one or more other ingredients of the extrudable composition be able to increase the viscosity of, i.e., viscosify or thicken, water 18 sufficiently to prevent phase separation that might otherwise occur if the viscosity of the water were to be too low during extrusion. In some embodiments of carrying out process 10, binder 14 is capable of acting as a viscosifier and is used in an amount effective to viscosify water 18 to an extrudable level. In other embodiments, phase separation may still occur during extrusion. In these other embodiments, perhaps binder 14 is not a viscosifier, or, if it is a viscosifier, adding additional binder 14 to further viscosity water 18 may result in granules 11 which are too sticky. In such circumstances, it may be desirable to incorporate an optional water soluble viscosifier 20 into the composition to be extruded.

Suitable water soluble viscosifiers 20 of the present invention are capable of increasing the viscosity of water 18 without causing undue, and preferably substantially no, stickiness between granules 11. Preferred water soluble viscosifiers 20 are also capable of boosting the viscosity of water 20 when used in relatively small amounts. Representative examples of suitable viscosifiers 20 include water soluble polymeric materials such as guar gum, xanthan gum, gellan gum, carboxy methyl cellulose, hydroxy ethyl cellulose, polyanionic cellulose, locust bean gum, polyacrylamide, combinations of these, and the like. In particularly preferred embodiments, the water soluble viscosifier 20 is a water soluble gum, such as guar gum, in that such gums are extremely effective viscosfiers.

Desirably, enough water soluble viscosifier 20 is added to viscosify water 18 sufficiently such that phase separation during extruding does not occur. In preferred embodiments, the water viscosity is increased in viscosifying step 32 to a value in the range from about 1000 to 10,000 centipoise, more preferably about 2,000 to 4,000 centipoise, as one way to avoid phase separation during extrusion. In preferred embodiments, using about 0.4 to about 1.0 parts by weight of viscosifier 20, and more preferably about 0.2 to 2 by weight of viscosifier 20 per 100 parts by weight of water 18, would be suitable in the practice of the present invention. As one specific example, 0.8 parts by weight of guar gum was used to viscosify 100 parts by weight of water 18. Then 50 parts by weight of this viscosified water was used in an extrudable composition including about 95 parts by weight of wet, raw peat 12, and about 5 parts by weight of wheat starch as binder 14.

When used, the water soluble viscosifier 20 can be incorporated into the extrudable composition in a variety of ways. For example, water soluble gums such as guar gum are typically supplied in powder form. Such powders can be added to the admixture of peat 12 and binder 14 in mixing step 22 and/or 30 as desired. However, some water soluble viscosifiers, particularly gums, may take some time to substantially fully dissolve in water, even at relatively high temperatures over 60° C. Accordingly, if a gum powder is added as an ingredient at one or both of mixing steps 22 or 30, the process 10 should be conducted to allow enough residence time between mixing step 30 and extruding step 35 in order to ensure that the gum is substantially fully dissolved in the water 20 before extrusion.

Allowing for such residence time, though, can be inconvenient. To avoid such delay, and as shown in FIG. 1, water soluble viscosifier 20 is preferably pre-dissolved in water 18 in viscosifying step 32. The resultant viscosified water of step 32 can then be combined with the other ingredients of the extrudable composition during mixing step 30. Advantageously, pre-dissolving viscosifier 20 in water 18 avoids the residence time delay that could otherwise occur if viscosifier 20 were to be mixed with the other ingredients in mixing steps 22 or 30.

Another advantage of predissolving the viscosifier 20 relates to the microtubular structure characterizing many kinds of peat particles. The microtubules contribute to many beneficial properties of peat, including its very high capacity to absorb liquids. When viscosified water is added at step 30, the viscosified water has much less of a tendency to plug up the microtubules than if the water added at step 30 was not yet thickened at the time of addition to the other ingredients. Thus, predissolving the viscosifier 20 in water 18 also helps preserve the microtubular structure of peat 12.

It is advantageous to add heat to the process. Heat can be added in a variety of forms and at one or more steps in the process 10, preferably at mixing step 30 and/or extruding step 35. Heat may be added via indirect electrical heat, via hot air, or most preferably by steam. Heat may also be added to the process by pre-heating water 18. Heat jacketing of the mixer of step 30 or of the extruder of step 35 also may be used. Preferably, in addition to or in place of jacketing, live steam may be injected directly into the mixer of step 30. Since water 18 needs to be added at step 30 anyway, the use of live steam at that step is preferred since it provides very quick and economical heating.

Heating provides multiple benefits. First, heating activates the binder 14 in the event binder 14 is a starch such as wheat starch. Heating also softens some of the ingredients which are heat softenable, and this softening eases extrusion. Heating further counteracts the cooling that results when inorganic additives which have a negative heat of solution, such as urea, are used. Moreover, when the composition includes fertilizer salts or the like, heating increases the amount of such salts which are dissolved in the composition. Less water is then required for good extrusion, and drying costs are reduced.

The ingredients are desirably heated to a temperature which facilities extrusion and provides good quality granules 11. If the extrudable composition is heated to a temperature which is too low, then a starch binder, if used, may not get activated and may, as a consequence, exhibit poor binding properties. Extrusion may be more difficult, too, if ingredients are not softened enough. On the other hand, if the composition is heated to a temperature which is too high, such high temperature could degrade one or more of the ingredients or cause excessive stickiness during granulation. In preferred embodiments, heating the composition to a temperature in the range from about 40° C. to about 100° C., more preferably 60° C. to 90° C. would be suitable.

According to one preferred approach, heating of ingredients is carried out at mixing step 30 using a conditioner. A conditioner is an apparatus including a tube and a shaft mounted inside the tube. Moveable paddles are provided on the shaft. The shaft can be rotated to aggressively mix and transport material along the tube. The angle of the paddles can be adjusted to control the speed at which material is transported along the tube from the inlet to the outlet end. Steam is injected directly into the tube through an injection port near the inlet end of the tube. The paddle angle which controls the residence time of the material in the conditioner, and the steam flow rate and temperature, are selected such that the ingredients exiting the conditioner are heated to a desired temperature as described above. In embodiments of the invention in which a conditioner with steam injection ports is used, the added steam is preferably at less than about 180° C. and is added in an amount which is less than 10 weight percent, more preferably less than 5 weight percent of the dry weight of solids passed through the conditioner. In one preferred embodiment of the invention, use of a steam conditioner commercially available from California Pellet Mill Company as Model Number C18LL65 has been found to be suitable in process 10.

After mixing step 30, the composition is preferably subjected to extruding step 35 to form an extrudate which is typically in the form of one or more elongate, spaghetti-like strands. Such strands thereafter can be divided into multiple pieces and granulated to form granules 11. Extrusion is desirably carried out under conditions which minimize the generation of heat and pressure as material is extruded. Avoiding heat generation and unduly high pressure is desirable because undue heat and/or high pressure can damage the peat. In particular, granules may result in which the beneficial properties of the original raw peat 12 have not been adequately preserved.

The extruder of step 35 can be any kind of extruder capable of generating extrusion pressures of at least 500 psi. Preferred extruders are single screw or twin screw extruders of the type used in food processing. A suitable extruder for step 36 of process 10 is a model E-750 extruder from EXTRU-TECH, Inc. To preserve the beneficial properties of the raw peat 12, extruding step 35 is carried out under relatively gentle extruding conditions. This approach helps to provide an even flow of extrudate from the extruder, which promotes the uniformity of granules 11. This approach also avoids damaging the extrudate and helps reduce, and even eliminate, the tendency of the water 18 to phase separate from the other ingredients during extrusion. In preferred embodiments, such gentle extrusion is achieved by extruding under conditions such that the linear velocity of the extrudate leaving the extruder is desirably in the range from about 5 to about 60 cm/s, more preferably about 10 to about 30 cm/s. It is further preferred if extrusion occurs at a relatively low extrusion pressure of less than 500 psi, preferably less than 350 psi, and more preferably at less than 250 psi. In the practice of the present invention, the extrusion pressure is measured at the exit end of the extruder barrel, just before the extrusion die.

Conventional extruder dies do not facilitate the gentle extrusion approach of this invention, because such dies, being designed for high pressures, do not have enough open area to allow extrusion to occur at the preferred low pressures of this invention. Accordingly, the present invention carries out extrusion step 35 using a preferred extrusion die extremely well suited for low pressure extrusion. The preferred, low pressure extrusion die comprises a plurality of apertures, wherein the ratio of the total open area provided by such apertures to the total area of the end of the extruder barrel is in the range from 0.5:10 to 7:10, more preferably 2:10 to 4:10. The apertures of such an extrusion die are preferably circular in shape and have a diameter corresponding to the desired diameter of granules 11. For example, to make granules 11 with a diameter of 2 mm, using apertures with a diameter of about 2 mm would be suitable.

In particularly preferred embodiments, the preferred, low pressure extrusion die is formed from perforated metal sheet, more preferably perforated metal sheet formed from stainless steel. Such perforated metal sheet is readily available in a very wide variety of grades. The thickness, material, hole spacing, hole size and hole shape can be selected. For this process 10, perforated metal with holes diameter in the range of from 1 mm to 5 mm, most typically about 2 mm is preferred. Perforated metal sheet can also be obtained with a wide range of total open area, depending upon the density and diameter of the apertures formed in the sheet. As a specific example, suitable perforated metal sheet having 1/8 inch (about 3 mm) apertures and about 40% open area and a thickness of 11 gauge is commercially available from McNichols Company in stainless steel sheets having dimensions of 4 feet by 8 feet. To use perforated metal sheet to make an extrusion die of this invention, a piece of sheet is cut to the size of the face of the extruder and fixed in place with a retaining collar bolted to the extruder.

When extruding through a die made from perforated metal sheet, the extruder conditions can be evaluated by observing the quality of the extrudate. In preferred embodiments and under proper conditions, the extrudate has the form and appearance of a plurality of spaghetti-like strands.

After the extruding step 35, the extrudate is subjected to granulating step 36. In this step, the extrudate emerging from the extruder drops approximately 1 foot down onto a conveyor belt where the extrudate is then transported to a granulator. The extrudate could equally well be allowed to drop directly into the granulator. Any suitable granulator can be used to accomplish step 36. Representative examples of suitable granulators include disc, pan, or drum granulators. During granulation, the extruded strands are divided into short pieces and then rolled into substantially spherical form. A preferred granulator employed at step 36 of process 10 is a Cascade Marumerizer Model QJ-1000 which is manufactured in Japan and sold in the United States by LCI Corporation.

The granules resulting from step 36 are not at their full strength and should be handled carefully. The full strength of the granules is developed during drying step 38. Drying may be accomplished using any drying approach which minimizes, and preferably substantially avoids, damage to the granules emerging from the granulator. As examples of suitable approaches, drying may be accomplished using a moving belt dryer, or a fixed bed dryer; or a fluidized bed dryer; or a rotary drum dryer or combinations of these approaches and the like. Typically, drying is carried out until the water content of the granules is less than about 15 weight percent, more preferably less than about 10 weight percent. A suitable dryer for step 38 of process 10 is a gas fired conveyor (moving belt) dryer, 8.5 ft. wide by 55 ft. long, manufactured by Proctor & Schwartz, Inc. As the granules are dried, the evaporation of the excess water in the granules provides granules 11 with a porous structure. The porous structure of granules 11 is particularly advantageous, because it preserves an important beneficial property of peat, namely high absorption capacity for liquids.

After drying, the material may be screened to remove oversize and/or undersize granules. The oversize and undersize material is returned via recycle, as shown schematically by pathway 41, to be mixed with the feed to the grinding step 24. The dried and screened granules 11 of this invention are substantially dust-free, and strong enough to remain relatively dust free during subsequent handling. The granules 11 may be packaged in bags or other appropriate container or dispatched in bulk form as desired.

The various steps of process 10 are desirably carried out on a continuous basis. However, as a practical matter, it may be desirable or necessary at times to start and stop certain of the process steps, particularly the grinding step 24 and the extruding step 35. Accordingly, process 10 further desirably incorporates intermediate storage step 28. Intermediate storage step 28 acts as a storage buffer so that an operator can stop process operations on one side of such a storage buffer while keeping process operations running on the other side. For example, if a hammermill used in grinding step 24 were to be stopped for service, process steps 30, 32 if desired, 35, 36, 38, and 40 could still be performed by drawing ingredients from the storage buffer. Similarly, if the extruder were to be stopped, grinding could continue by storing the ground ingredients in the storage buffer until extrusion could be resumed. Any ordinary storage bin would make a good storage buffer.

The present invention will now be further described with reference to the following examples.

EXAMPLE 1

A sphagnum peat in partially dried and ground form was obtained. To this peat was added 5% by weight wheat starch based upon the wet weight of the raw peat. A batch mix was made. The mixture was ground in two hammer mills in series to pass a final screen of 1.19 mm. This ground mixture was conveyed to an intermediate storage bin, and from there to a small feeder bin. From the feeder bin, the mixture was metered continuously via a screw conveyor into a conditioner. Water was added to the conditioner at a mass flow rate approximately equal to the mass flow rate of the ground peat-containing mixture. The resultant mixture was dropped directly into the extruder in continuous fashion. Low pressure extrusion was then carried out in a cooker extruder at a pressure of less than about 350 psi through an extrusion die formed from perforated metal sheet having apertures with a diameter of about 2 mm and a total open area of 33% based upon the total area of the die. Extrusion was possible but difficult to control.

EXAMPLE 2

The method of Example 1 was repeated except that sufficient steam was added by direct injection into the conditioner to raise the temperature of the extrudate from about 60° F. to about 120° F. The steam flow rate was adjusted via a manually operated gate valve on a 150 psi steam line just before the injection port. The steam flow rate was not measured, but is calculated to have been in the range of 4 to 6 lbs. of steam per 100 lbs. of wet mixture in the conditioner. A more coherent extrudate was achieved using this process than was obtained in Example 1.

EXAMPLE 3

The method of Example 2 was repeated, except that the added water was pre-thickened with 0.8 weight percent of guar gum based upon the added water weight. Low pressure extrusion at a pressure of about 250 psi was now easily achieved and optimized by adjusting the water and steam flow rates. Extrusion at 5 tons per hour (wet weight) was easily maintained. The resultant dried granules were screened to a size range of −6+14 mesh (US Standard sieves). The water content of the dried granules was about 5% by weight. The dry granules were strong enough not to generate dust during bagging and use, and were free flowing and easy to handle. This granular peat absorbed 1.8 times its own weight of a light mineral oil, and more than twice its own weight of water. In preliminary tests it was found to be useful as a floor dry and as a cat litter. Microscopic examination of the granules showed a large amount of fibrous material in the granules.

EXAMPLE 4

A sphagnum peat in compressed bales was obtained. This material had a water content of about 45% by weight. It was mixed with 5% by weight wheat starch based upon the wet weight of the raw peat. The composition was then hammer-milled to less than 1.19 mm. After grinding, about 50 parts by weight of water thickened with various levels of guar gum (0.6% to 1%) was added to 100 parts by weight of the hammermilled composition. Steam was injected into the conditioner to give an extrudate temperature of about 120° F. Low pressure extrusion at a pressure of 350 psi or less was carried out at a production rate of about 5 tons per hour (wet weight) through an extrusion die having 1/8 inch diameter holes and 40% open area. Subsequent granulation and drying to about 6% by weight water, and screening to −5+14 mesh (US Standard sieves) produced a granular peat of spherical, free flowing character with very little dust. All of the granules of this example had a bulk density of about 26 pounds per cubic foot, and absorbed more than 1.7 times their own weight of water. During water absorption, the granules swelled; the volume increased by 58% on saturation with water. This peat was potentially useful for soil improvement. When added to water at a level of 30% by mass, these granules produced a pH in the water of 6.5. In an otherwise identical test, potassium carbonate derived from sunflower hull ash was added to the starting mixture of peat and starch. Strong, dust-free granules with excellent flow behavior were produced. The pH of the water to which these granules were added was 8.5.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making peat-containing granules, comprising the steps of:
    providing an extrudable composition comprising:
        (i) a plurality of two peat particles;
        (ii) a binder in an amount effective to cohesively bind the peat particles together in a manner such that there is substantially no adhesion between granules formed after extrusion; and
        (iii) an amount of water effective to provide the composition with a consistency such that the composition can be cohesively extruded;
    (b) extruding the composition to form a wet, cohesive extrudate;
    (c) converting the wet, cohesive extrudate into a plurality of wet, peat-containing particles; and
    (d) drying the wet peat-containing particles until the particles contain less than about 15% by weight water, whereby the peat-containing granules are formed.

2. The method of claim 1, wherein the extrudable composition further comprises a water soluble viscosifier in an amount effective to substantially prevent phase separation between the peat, binder, and water during extrusion.

3. The method of claim 1, wherein the peat particles comprise fibrous peat particles.

4. The method of claim 1, wherein the composition comprises:

(a) about 100 parts by weight of the peat particles on a dry weight basis;
    (b) about 1 to about 10 parts by weight of the binder;
    (c) about 20 to about 200 parts by weight of water; and
    (d) about 0.001 to about 4 parts by weight of the water soluble viscosifier.

5. The method of claim 1, wherein the composition comprises:
    (a) about 100 parts by weight of the peat particles on a dry weight basis;
    (b) about 3 to about 7 parts by weight of the binder;
    (c) about 40 to about 120 parts by weight of water; and
    (d) about 0.1 to about 1.5 parts by weight of the water soluble viscosifier.

6. The method of claim 4, wherein the binder comprises a starch.

7. The method of claim 6, wherein the starch is selected from the group consisting of wheat starch, rice starch, tapioca starch, rye starch, soy bean starch, potato starch, corn starch, and combinations thereof.

8. The method of claim 4, wherein the binder comprises wheat starch.

9. The method of claim 4, wherein the binder comprises a water soluble polyvinyl polymer.

10. The method of claim 9, wherein the polyvinyl polymer is selected from the group consisting of polyvinyl alcohol, polyvinyl acetate, and combinations thereof.

11. The method of claim 4, wherein the granules are substantially spherical.

12. The method of claim 4, wherein the water soluble viscosifier comprises a water soluble polymeric viscosifier.

13. The method of claim 12, wherein the water soluble polymeric viscosifier is selected from the group consisting of guar gum, gellan gum, xanthan gum, carboxy methyl cellulose, hydroxy ethyl cellulose, polyanionic cellulose, locust bean gum, polyacrylamide, and combinations thereof.

14. The method of claim 12, wherein the water soluble polymeric viscosifier is guar gum.

15. The method of claim 4, wherein the step of extruding comprises extruding the composition at a pressure of less than about 500 psi.

16. The method of claim 4, wherein the step of extruding comprises extruding the composition at a pressure of less than about 350 psi.

17. The method of claim 4, wherein the step of extruding comprises extruding the composition through an extrusion die comprising a plurality of apertures, wherein the ratio of the total area of said apertures to the total are of the face of the die against which extrusion occurs is in the range from about 0.5:10 to about 7:10.

18. The method of claim 17, wherein the ratio of the total area of said apertures to the total are of the face of the die against which extrusion occurs is in the range from about 2:10 to about 4:10.

19. The method of claim 4, wherein the step of providing the extrudable composition comprises the steps of:
    (a) providing a first admixture comprising the peat particles and the binder;
    (b) providing a second admixture comprising the water and the water soluble viscosifier, wherein the water soluble viscosifier is substantially dissolved in the water; and
    (c) combining the first admixture and the second admixture.

20. The method of claim 19, wherein the peat particles comprise fibrous peat particles; the binder comprises a starch selected from the group consisting of wheat starch, rice starch, tapioca starch, rye starch, soy bean starch, potato starch, corn starch, and combinations thereof; and the water soluble viscosifier comprises a water soluble gum.

21. The method of claim 4, wherein the binder comprises a starch and the step of providing the extrudable composition further comprises heating the composition prior to extruding.

22. The method of claim 21, wherein the step of heating the composition comprises heating the composition to a temperature in the range from about 40° C. to about 100° C. using steam.

23. The method of claim 4, wherein the extruding step comprises extruding the composition through a die configured such that the extrudate comprises a plurality of elongate strands.

24. The method of claim 23, wherein the converting step comprises dividing the elongate strands into a plurality of wet, peat-containing pieces and granulating the pieces to provide a plurality of the pieces with a substantially spherical shape.

* * * * *

UNITED STATES PATENT AND TRADEMARK OFFICE
CERTIFICATE OF CORRECTION

PATENT NO. : 6,287,496 B1
DATED : September 11, 2001
INVENTOR(S) : Charles Michael Lownds It is certified that error appears in the above-identified patent and that said Letters Patent is hereby corrected as shown below:

<u>Column 13, claim 1,</u>
Line 44, before the word "providing" insert an -- (a) --.
Line 45, delete the word [two].

Signed and Sealed this

Twenty-sixth Day of March, 2002

JAMES E. ROGAN
*Director of the United States Patent and Trademark Office*

*Attest:*

*Attesting Officer*